Aug. 14, 1962   R. F. SCHREITMUELLER   3,049,702
SINGLE TARGET HEIGHT INDICATOR
Filed May 15, 1958   2 Sheets-Sheet 1

INVENTOR
RUDOLPH F. SCHREITMUELLER,
BY
*C. V. Craddock*
ATTORNEY

Aug. 14, 1962   R. F. SCHREITMUELLER   3,049,702
SINGLE TARGET HEIGHT INDICATOR
Filed May 15, 1958   2 Sheets-Sheet 2
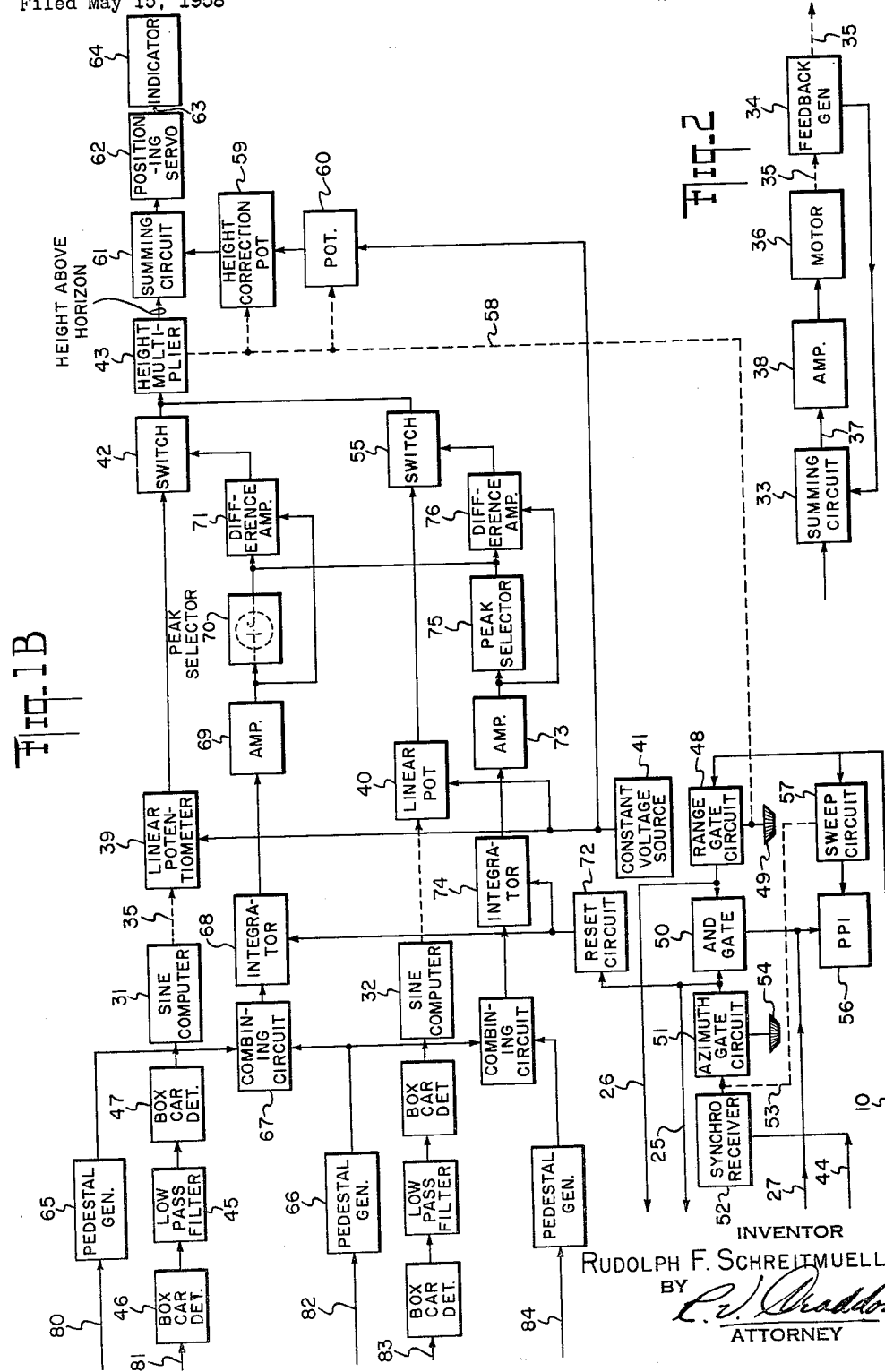
INVENTOR
RUDOLPH F. SCHREITMUELLER
BY
ATTORNEY

United States Patent Office 3,049,702
Patented Aug. 14, 1962

3,049,702
SINGLE TARGET HEIGHT INDICATOR
Rudolph F. Schreitmueller, Garden City, N.Y., assignor to Sperry Rand Corporation, a corporation of Delaware
Filed May 15, 1958, Ser. No. 736,658
5 Claims. (Cl. 343—5)

The invention relates to radar target indicators and more specifically to a single target height indicator suitable for use in a stacked-beam radar.

A stacked-beam radar incorporates a plurality of directional microwave antennas which are mounted or "stacked" one above the other in a vertical plane. Each of the stacked antennas comprising the stacked-beam antenna array is directed along a predetermined and respective elevation angle and is energized by a common transmitter. The reflected target signals, received by each of the stacked antennas, are applied to respectively associated receivers. A measure of the elevation angle of a target may be determined by comparing the relative received signal strengths in each of the respectively associated receivers.

For the display of received target data, prior art practice has been to provide a range-height indicator of a cathode ray tube type on whose face intensified target indications are displayed as a function of range versus target height. In this way, data respecting all received targets is simultaneously displayed on a single cathode ray tube indicator.

The range-height indicator supplements additional target data which is displayed on a separate indicator, for example, a PPI. In general, each of the separate target data indicators is observed by a different operator. Consequently, a communication link must be provided between the operators in order that they may correlate the range and height data displayed by the range-height indicator with the range and azimuth data displayed by the PPI.

It is the principal object of the present invention to provide means whereby a single operator of a stacked-beam radar may determine the height of a preselected target.

Another object is to provide means for displaying height information respecting a target which is preselected on the basis of slant range and azimuth.

An additional object is to provide a digital indication of the height of a predetermined target received on stacked-beam radar.

Another object is to improve the accuracy of target height indication in a stacked-beam radar system.

A further object is to eliminate ambiguity of height indication where a plurality of targets lie at substantially the same slant range and azimuth but along substantially different elevation angles.

These and other objects of the present invention, as will appear from a reading of the following specification, are achieved by the provision of a stacked-beam radar receiver adapted to produce an individually available plurality of target video output signals each of which is associated with a respective one of the antennas of the stacked-beam array. The video output signals are logarithmically amplified and compared in adjacent receiving channel pairs to produce difference signals, each having an amplitude related to the difference in decibels between the video signals in a respective adjacent pair of receivers. The db difference in turn is related to target elevation angle by the antenna vertical beam difference pattern. Range and azimuth gating means are provided to select the difference signal corresponding to a predetermined target.

The selected difference signal is then compared with a stored data signal representing the antenna vertical beam difference pattern of a respective adjacent pair of the stacked antennas to convert the difference signal to an elevation signal proportional to the sine of the elevation angle of the predetermined target. The elevation signal is multiplied by a further signal proportional to the range of the predetermined target to produce a product signal. The product signal is applied to servo means for positioning a mechanical indicator which may be of a digital drum type.

Additionally, means are provided for selecting the elevation signal corresponding to the highest of a plurality of targets for energizing the servo means in the event that a plurality of target signals are received at substantially the same slant range and azimuth but along substantially different elevation angles.

The structural details of the invention are shown in the appended figures of which:

FIG. 1B is a block diagram of a representative embodiment of the target selector and height indicator portion of the present invention; and FIG. 2 is a block diagram of a sine computer for use in the apparatus of FIG. 1B.

Figure 1A:
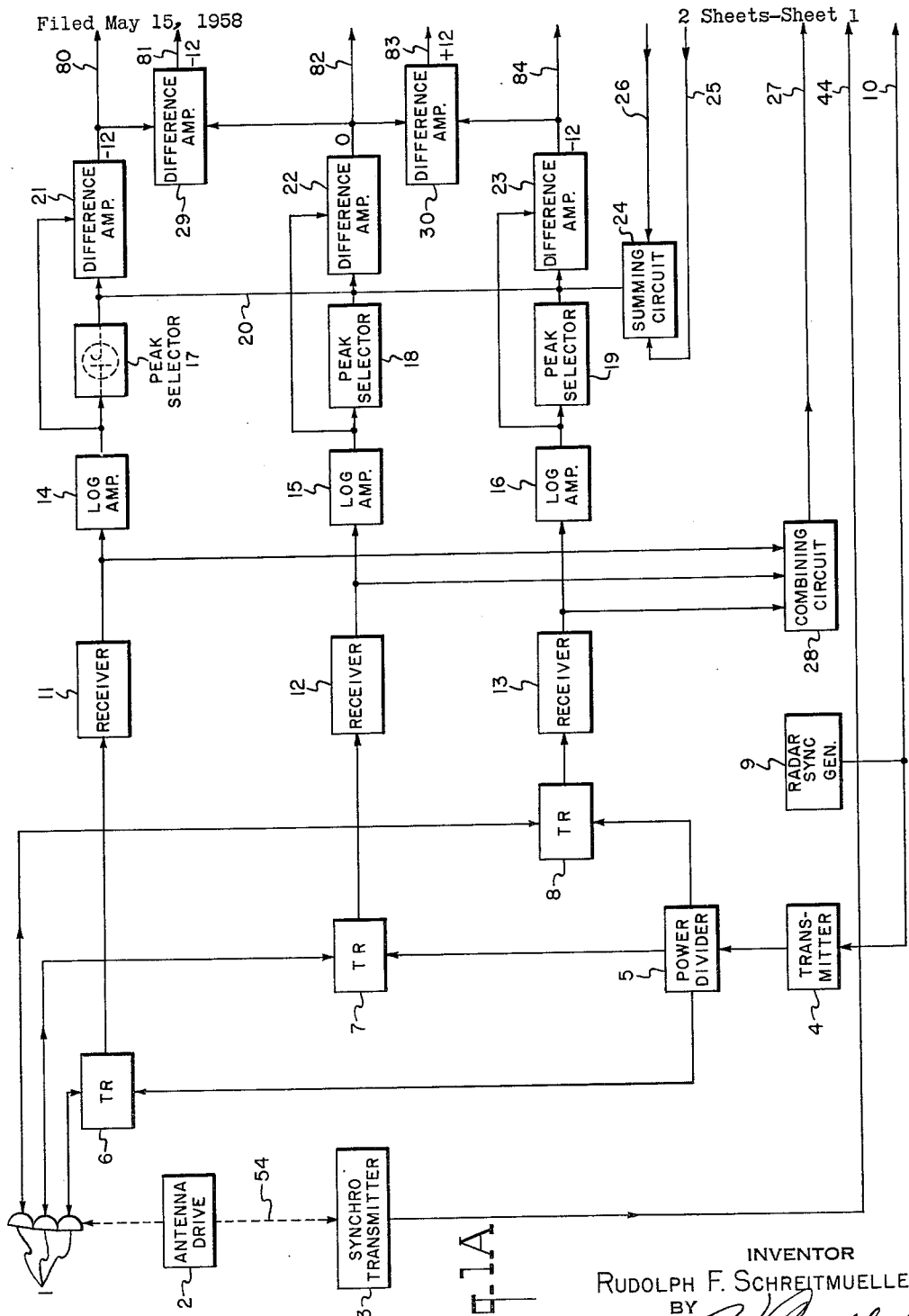
FIG. 1A is a block diagram of a representative embodiment of the stacked-beam radar and elevation angle computer portion of the present invention.

In FIG. 1A, a stacked-beam antenna array is generally represented by the individual directional antennas 1, three of which are shown by way of example. Each of the directional antennas 1 is oriented along a respective and predetermined elevation angle and is so positioned that there is some degree of vertical overlap between the beam patterns of adjacent ones of said antennas. The stacked antenna array is azimuthally driven by antenna drive 2 which is also mechanically linked to synchro transmitter 3. The electrical signal output of synchro transmitter 3 is coupled by line 44 to the target selector and height indicator of FIG. 1B.

Each of the individual directional antennas 1 is energized by a common transmitter 4 whose output is applied to power divider 5. Power divider 5 applies to respective ones of the directional antennas 1 a predetermined proportion of the total power output of transmitter 4. For example, in order to extend the range coverage of the stacked-beam radar system, more power is directed into the lower elevation angle antennas than to the ones oriented along higher elevation angles. The individual outputs of divider 5 are coupled via respectively associated TR devices 6, 7 and 8 to the individual stacked antennas. Transmitter 4 is pulsed at the radar repetition rate by radar sync generator 9 whose output is applied via line 10 to transmitter 4 and to the target selector and height indicator of FIG. 1B.

A plurality of receivers 11, 12 and 13 are coupled to a respectively associated staced antenna by TR devices 6, 7 and 8. The detected video output signals from each of the receivers are applied to a respective one of the logarithmic amplifiers 14, 15 and 16. Each of the logarithmic amplifiers in turn is connected to an associated peak selector 17, 18 and 19. The output of each peak selector is connected to a first input of a respective difference amplifier 21, 22 and 23. Second inputs to each of the difference amplifiers are derived from the output of a respective one of the logarithmic amplifiers 14, 15 and 16. The signal outputs of each of the difference amplifiers 21, 22 and 23 are combined in adjacent receiving channel pairs in difference amplifiers 29 and 30.

Line 20 at the output of the peak selectors is connected to summing circuit 24 having two inputs 25 and 26 derived from the target selector and height indicator of FIG. 1B. The stacked-beam radar and angle computer of FIG. 1A produces an additional output signal on line 27 for application to the apparatus of FIG. 1B. Said additional output signal is produced by combining circuit 28 which sums the detected video signals at the outputs of receivers 11, 12 and 13.

Neglecting for the moment the purposes of the inputs 25 and 26 of summing circuit 24, it will be seen that peak selector circuits 17, 18 and 19 produce on line 20 a signal proportional in amplitude to the strongest of the detected video signals appearing at the outputs of receivers 11, 12 and 13. Assuming for purposes of illustration that each of said peak selectors comprises a diode poled as indicated by the dotted representation within selector 17, the potential on line 20 will be equal to the amplitude of the highest positive video signal at the input to any one of peak selectors 17, 18 and 19. The clamping of line 20 to the highest signal level renders all of the peak selectors nonconductive excepting the one to which the highest amplitude signal is applied.

If a target is situated along the axis of the beam associated with receiver 12, maximum amplitude positive video pulses will be produced at the output of video amplifier 15 while lower but substantially equal amplitude pulses will appear at the output of amplifiers 14 and 16. As a result, line 20 will be clamped to the level of the video pulse at the output of logarithmic amplifier 15. Each of difference amplifiers 21, 22 and 23 operate to subtract the signal of line 20 from a respective one of the signals appearing at the outputs of amplifiers 14, 15 and 16. Consequently, negative output signals are generated by amplifiers 21 and 23 while no output signal is produced by difference amplifier 22.

As is understood in the stacked-beam radar art, the elevation beam pattern of each of the stacked directional antennas 1 is preferably of the shape of the same Gaussian function. It can be shown that the logarithm of the Gaussian function is a parabola and that the difference between two such parabolas is a straight line. Consequently, as the position of the target varies in elevation angle within two adjacent beams, the amplitudes of the target video signals at the outputs of the receivers (12 and 13, for example) associated with said beams also conform to a Gaussian function while the amplitudes of the signals at the outputs of logarithmic amplifiers 15 and 16 follow a parabolic curve and the amplitudes of the difference signal at the output of amplifier 30 follow a straight line. Thus, as a target moves in elevation angle within the vertically overlapping beams associated with receivers 12 and 13, a signal is produced at the output of amplifier 30 having an amplitude linearly related to the angular deviation of the target from the crossover angle of said overlapping antenna beam patterns. The crossover angle is defined as the elevation angle along which the gains of the two adjacent antennas are equal.

As a practical matter, it is difficult to effect a precisely Gaussian shape for each of the beam patterns of the stacked antenna array so as to produce a linear relationship between the amplitudes of the output signals of amplifiers 29 and 30 and the deviation angles of the target from the respective beam pattern crossover angle. Additionally, except for very small elevation angles, the amplitude of the output signal from each of amplifiers 29 and 30 is not proportional to the sine of the target deviation angle which is required for height computation.

The present invention provides for the accurate determination of the sine of the target deviation angle by the employment of sine computers 31 and 32 of FIG. 1B. Each of the sine computers is coupled to the output of a respective difference amplifier by a network designed to extract a substantially D.C. signal component from the grouped pulsed signals which appear at the outputs of difference amplifiers 29 and 30. Said grouped signals are produced each time that the array of stacked antennas 1 is driven through the azimuth position of the target. The number of target video pulses in each group of pulses depends upon the repetition rate of generator 9 and the azimuth scanning speed of antenna drive 2. In a representative case and assuming a single target, a group of thirty pulses may be produced for each azimuth revolution of the antenna array as the array rotates through the target azimuth position. Such groups of pulses are produced at the output of difference amplifier 29, for example, in the event that target elevation angle lies within the beams associated with receivers 11 and 12.

Amplifier 29 is coupled to sine computer 31 by a network comprising box car detector 46, low pass filter 45, and box car detector 47. Box car detector 46 produces in a conventional fashion a signal of "staircase" shape having "steps" which correspond to the amplitudes of respective ones of the pulses produced at the output of amplifier 29. The staircase signal output of detector 46 is applied to low pass filter 45 which passes substantially only the D.C. component. The passed D.C. component, having a duration proportional to the duration of each group of pulses at the output of amplifier 29, may not persist for a sufficient length of time to permit sine computer 31 to fully respond thereto. Accordingly, box car detector 47 is provided between the output of low pass filter 45 and the input to computer 31 to lengthen the persistence of the D.C. component.

A representative embodiment of sine computer 31, for example, is shown in FIG. 2. The output signal from box car detector 47 is applied to a first input of summing circuit 33, a second input to which is derived from the output of feedback generator 34. Feedback generator 34 may consist of a nonlinear potentiometer whose resistance characteristic conforms to the antenna vertical beam difference pattern as a function of the sine of the elevation angle obtaining between the vertically overlapping beams of the stacked antennas to which receivers 11 and 12 are coupled. The difference pattern of the vertically overlapping beams such as those of the antennas coupled to receivers 11 and 12 is determined simply by subtracting the respective beam patterns, each of which is plotted in received signal db as a function of elevation angle in accordance with known techniques.

In typical servo fashion, an error signal is developed on line 37 at the output of summing circuit 33 resulting from the comparison of the output signal of box car detector 47 with the output signal of feedback generator 34. The error signal is amplified in amplifier 38 and is applied to motor 36 to position the slider of the potentiometer comprising feedback generator 34. Shaft 35 will come to rest upon the disappearance of the error signal at the output of summing circuit 33 whereupon the output signal of box car detector 47 is matched in amplitude to the output signal of feedback generator 34. In the steady state, the position of shaft 35 is proportional to the sine of the deviation angle of the target with respect to the crossover angle between the overlapping beams of the stacked antennas associated with receivers 11 and 12. In this way, the signal at the output of detector 47 is compared with stored data signals representing the antenna vertical beam difference pattern of the respective adjacent pair of the stacked antennas to produce a signal proportional to the sine of the target deviation angle as measured from the crossover angle of the overlapping beams of said pair of stacked antennas.

Shaft 35 positions the slider of linear potentiometer 39 which serves to convert the shaft position into a corresponding electrical signal having an amplitude proportional to the sine of the target deviation angle as measured from the horizon. Potentiometers 39 and 40 are jointly energized by constant voltage source 41. The signal at the slider of potentiometer 39 is applied via switch 42 (when conducting) to a first input of height multiplier 43.

As previously mentioned, provision is made in the present invention for the selection of a predetermined target based upon the slant range and azimuth of the target. Such target selection is accomplished by the action of the gating circuits which are coupled by lines 25 and 26 to summing circuit 24. The pulse repetition rate triggers of line 10 are applied to range gate circuit 48 which produces an output pulse on line 26 which is variably positioned in time, relative to the occurrence of the repetition rate triggers, in accordance with the setting of control knob 49. The delayed pulse output of circuit 48 is also applied to a first input of AND gate 50.

A second input to AND gate 50 is derived from the output of azimuth gate circuit 51. The signal output of synchro transmitter 3 is connected by line 44 to the input of synchro receiver 52. In a well known fashion, the shaft output 53 of synchro receiver 52 follows the azimuth rotation of shaft 54. Shaft 53 drives azimuth gating circuit 51 which may consist of a positionable microswitch which is closed once per revolution of input shaft 53 each time that shaft 53 reaches a selectable reference position determined by the setting of control knob 54. Azimuth gating circuit 51 also includes a source of potential which is connected to line 25 each time the microswitch of azimuth gating circuit 51 is closed.

In this way, gating pulses are produced on lines 25 and 26 in accordance with the setting of azimuth and range gating circuits 51 and 48. The gating pulses are combined in summing circuit 24 and render peak selectors 17, 18 and 19 conductive during their simultaneous occurrence. For example, the potential of line 20 may be held highly positive except during the occurrence of the gating pulses to block conduction of the peak selectors.

It will be seen that switches 42 and 55 are also rendered nonconductive in the absence of the azimuth and range gating pulses. The nonconduction of switches 42 and 55 prevents the application of the elevation signal to height multiplier 43 thus precluding the computation of target height.

Control knobs 49 and 54 are positioned with the aid of PPI 56. Sweep circuit 57 receives repetition rate triggers via line 10 and antenna azimuth information from shaft 53 to produce a conventional rotating radial sweep on PPI 56. The range and azimuth gating signals are applied to an intensity modulation electrode of PPI 56 by AND gate 50. Target video signals are applied to PPI 56 by line 27 at the output of combining circuit 28. By the positioning of control knobs 54 and 49, the azimuth and range gating signals may be aligned with the azimuth and range of a predetermined target displayed on PPI 56. Control knob 49 also positions shaft 58 which supplies mechanical range data to height multiplier 43.

Height multiplier 43 may consist of a linear potentiometer which is energized by the elevation signal present at the output of switch 42 and whose slider is positioned by shaft 58. The potential at the slider of the potentiometer of multiplier 43 is a product signal having an amplitude proportional to target height above the horizon. The product signal is applied to a first input of summing circuit 61. The signal applied to the second input of summing circuit 61 corrects for the height of the horizon above the surface of the earth and for the refraction of the radar signals through the atmosphere. Both these corrections can be approximated by a value of height which is proportional to the square of target range. Shaft 58 positions the slider of potentiometer 60 which is energized by constant voltage source 41. The slider signal output of potentiometer 60 is proportional to target range.

The slider signal output energizes, in turn, height correction potentiometer 59 whose slider is also driven by shaft 58. Height correction potentiometer 59 is wound linearly to produce an output voltage representing $H_c$ and governed by the expression $H_c = .695R^2$ wherein $H_c$ is the height correction factor expressed in feet and R is target range expressed in miles. The height correction signal output of potentiometer 59 is summed in circuit 61 with the target height signal output of multiplier 43. The resultant signal output of summing circuit 61 drives a conventional positioning servo 62 whose output shaft 63 positions indicator 64. Indicator 64 may be of a direct reading digital drum display type.

The control circuits associated with switches 42 and 55 serve the dual functions of rendering switches 42 and 55 conductive only in the presence of target video signals and preclude ambiguity of height indication in the event that a plurality of targets are present at substantially the same slant range and azimuth but along substantially different elevation angles.

The input to the controlling circuits of switch 42, for example, is derived from the outputs of difference amplifiers 21 and 22 of FIG. 1A. It was previously mentioned that grouped pulsed signals appear at the outputs of amplifiers 21 and 22. The amplitude of the pulses of each group is determined by the deviation of the target from the axis of the beams associated with the difference amplifiers. Pedestal generators 65 and 66 of FIG. 1B are adapted to produce uniform amplitude output pulses in response to input pulses which exceed a predetermined threshhold value. The threshhold value is set so that the pedestal generators will be energized only by a signal having an amplitude exceeding that which would be produced at the output of amplifier 22, for example, by a target outside the spacial boundaries defined by the axes of the antenna beams associated with receivers 11 and 13.

Pedestal generators 65 and 66 are coupled via combining circuit 67 to integrator 68. Integrator 68 may be a conventional diode step counter which reaches a predetermined voltage level in response to a predetermined number of the reference pulse outputs of pedestal generators 65 and 66. Assuming, for example, that approximately thirty target video pulses are produced each time the stacked antenna array scans past the target azimuth position, the predetermined voltage level of integrator 68 is set to be reached upon the occurrence of fifteen pulses at the outputs of either pedestal generators 65 or 66. The output signal of integrator 68 is coupled via amplifier 69, peak selector 70, and difference amplifier 71 to the control input of switch 42. Thus, switch 42 is rendered conductive substantially upon the occurrence of the center of each group of target video signals. The charge stored in integrator 68 is removed at a predetermined time following the end of the azimuth gate by means of reset circuit 72. Reset circuit 72 produces a delayed pulse in response to each azimuth gate signal for discharging the integrators.

The control circuit for switch 55 is identical to the previously described one for switch 42 with the exception of amplifier 73. Amplifier 73 is designed to have a higher gain than amplifier 69. In the event that two targets lie at substantially the same slant range and azimuth but at substantially different elevation angles, signals exceeding the predetermined voltage level may be produced at the outputs of both integrators 68 and 74. The higher of the two targets will be represented by the signal output of integrator 74. Because of the higher gain of amplifier 73, the signal input to peak selector 75 will exceed that at the input of peak selector 70. Peak selectors 70 and 75 and difference amplifiers 71 and 76 operate in the same manner as peak selectors 17, 18 and 19 and difference amplifiers 21, 22 and 23. Accordingly, peak selector 70 will be rendered nonconductive by the operation of peak selector 75 in response to the greater amplitude output signal of amplifier 73 whereby no output signal is produced by difference amplifier 76 and a negative output signal is produced by difference amplifier 71.

Switches 42 and 55 may each consist of, for example, a relay which is set to become energized in the presence of a control potential of zero volts. Consequently, switch 55 will be rendered conductive and switch 42 will be rendered nonconductive connecting the output of linear potentiometer 40 to the input of height multiplier 43. Indicator 64 will then display the height corresponding to the higher of the two targets which lie at substantially the same slant range and azimuth.

From the preceding specification it can be seen that the objects of the present invention have been achieved by the provision of a single target height indicator for use in a stacked-beam radar receiver. The angle computer and target selector of the present invention produces an output signal corresponding to the height of a predetermined one of a plurality of targets selected on the basis of slant range and azimuth. In the event that a plurality of targets exist at substantially the same slant range and azimuth but along substantially different elevation angles, the target selector of the invention applies only the signal corresponding to the highest of said plurality of targets to the target height indicator.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A target height indicator comprising a multichannel stacked-beam radar receiver producing a plurality of output signals, each output signal having an amplitude related to the angular deviation of the target from the axis of the beam associated with a respective receiver channel, means for differentially comparing the amplitudes of the output signals of adjacent pairs of receiver channels to produce at least one first signal, each first signal having an amplitude related to the angular deviation of said target as measured from the crossover angle of a respective adjacent beam pair, a sine computer for producing a second signal proportional to the sine of an angle represented by the amplitude of an applied signal, said first signal being applied to said sine computer, means connected to the output of said sine computer for converting said second signal into a third signal, said third signal being proportional to the sine of the angular deviation of said target as measured from the horizon, means for producing a fourth signal proportional to the range to said target, signal multiplying means for receiving said third and fourth signals to produce a product signal proportional to the height of said target, said third and fourth signals being applied to said multiplying means, and means for indicating said product signal.

2. A target height indicator comprising a multichannel stacked-beam radar receiver producing a plurality of output signals, each output signal having an amplitude related to the angular deviation of the target from the axis of the beam associated with a respective receiver channel, means for logarithmically amplifying each of said output signals, means for differentially comparing the amplitudes of the amplified output signals corresponding to adjacent pairs of receiver channels to produce at least one first signal, each first signal having an amplitude related to the angular deviation of said target as measured from the crossover angle of a respective adjacent beam pair, a sine computer for producing a second signal proportional to the sine of an agle represented by the amplitude of an applied signal, said first signal being applied to said sine computer, means connected to the output of said sine computer for converting said second signal into a third signal, said third signal being proportional to the sine of the angular deviation of said target as measured from the horizon, means for producing a fourth signal proportional to the range to said target, signal multiplying means for receiving said third and fourth signals to produce a product signal proportional to the height of said target, said third and fourth signals being applied to said multiplying means, and means for indicating said product signal.

3. A target height indicator comprising a multichannel stacked-beam radar receiver producing a plurality of output signals, each output signal having an amplitude related to the angular deviation of the target from the axis of the beam associated with a respective receiver channel, means for differentially comparing the amplitudes of the output signals of adjacent pairs of receiver channels to produce at least one first signal, each said first signal having an amplitude related to the angular deviation of said target as measured from the crossover angle of a respective adjacent beam pair, a sine computer for producing a second signal proportional to the sine of an angle represented by the amplitude of an applied signal, said first signal being applied to said sine computer, means connected to the output of said sine computer for converting said second signal into a third signal, said third signal being proportional to the sine of the angular deviation of said target as measured from the horizon, signal multiplying means for receiving said third signal and a fourth signal proportional to the range to said target to produce a product signal proportional to the height of said target, adjustable means for generating range and azimuth gating signals, said adjustable means generating said fourth signal and rendering said multiplying means operative during the simultaneous occurrence of said range and azimuth gating signals, said third and fourth signals being applied to said multiplying means, and means for indicating said product signal.

4. A target height indicator comprising a multichannel stacked-beam radar receiver producing a plurality of output signals, each output signal having an ampltiude related to the angular deviation of the target from the axis of the beam associated with a respective receiver channel, means for differentially comparing the amplitudes of the output signals of adjacent pairs of receiver channels to produce at least one first signal, each first signal having an amplitude related to the angular deviation of said target as measured from the crossover angle of a respective adjacent beam pair, a plurality of sine computers each producing a second signal proportional to the sine of an angle represented by the amplitude of an applied signal, each said first signal being applied to a respective sine computer, means connected to the output of each said sine computer for converting each said second signal into a respective third signal, each said third signal being proportional to the sine of the agnular deviation of said target as measured from the horizon, means for producing a fourth signal proportional to the range to said target, signal multiplying means, said fourth signal being applied to said multiplying means, means for selectively applying one of said third signals to said multiplying means; said means for selectively applying including means for combining said output signals corresponding to adjacent pairs of receiver channels to produce a plurality of fifth signals, means for individually amplifying each of said fifth signals by different amounts, means connected to said last-named means for selecting the amplified fifth signal having the greatest amplitude, and means for applying to said multiplying means the third signal corresponding to the same adjacent pair of receiver channels as said selected fifth signal; said signal multiplying means producing a sixth signal proportional to the height of said target and indicating means responsive to said sixth signal.

5. A target height indicator comprising a multichannel stacked-beam radar receiver producing a plurality of output signals, each output signal having an amplitude related to the angular deviation of the target from the axis of the beam associated with a respective receiver channel, means for logarithmically amplifying each of said output signals, means for differentially comparing the amplitudes of the amplified output signals corresponding to adjacent pairs of receiver channels to produce a plurality of first signals, each first signal having an amplitude related to the angular deviation of said traget as measured from the crossover angle of a respective adjacent beam pair, a plurality of sine computers each producing a second signal proportional to the sine of an angle represented by the amplitude of an applied signal, each said first signal being applied to a respective sine computer, means connected to the output of each said sine computer for converting each said second signal into a respective third signal, each said third signal being proportional to the sine of the angular deviation of said target as measured from the horizon, means for producing a fourth signal proportional to the range to said target, signal multiplying means, said fourth signal being applied to said multiplying means, means for selectively applying one of said third signals to said multiplying means; said means for selectively applying including means for combining said output signals corresponding to adjacent pairs of receiver channels to produce a plurality of fifth signals, means for individually amplifying each of said fifth signals by different amounts, means connected to said last-named means for selecting the amplified fifth signal having the greatest amplitude, and means for applying to said multiplying means the third signal corresponding to the same adjacent pair of receiver channels as said selected fifth signal; said signal multiplying means producing a sixth signal proportional to the height of said target and indicating means responsive to said sixth signal.

References Cited in the file of this patent

UNITED STATES PATENTS

| | | |
|---|---|---|
| 2,810,905 | Barlow | Oct. 22, 1957 |
| 2,859,438 | Reed | Nov. 4, 1958 |